United States Patent [19]

Horn et al.

[11] Patent Number: 5,306,477

[45] Date of Patent: Apr. 26, 1994

[54] USE OF WROUGHT AND CAST MATERIALS AND WELDING FILLERS FOR MAKING AND USING HOT CONCENTRATED SULPHURIC ACID OR OLEUM

[75] Inventors: Elmar-Manfred Horn, Leverkusen; Stylianos Savakis, Koeln, both of Fed. Rep. of Germany

[73] Assignee: Bayer Aktiengesellschaft, Leverkusen, Fed. Rep. of Germany

[21] Appl. No.: 48,163

[22] Filed: Apr. 15, 1993

[30] Foreign Application Priority Data

Apr. 23, 1992 [DE] Fed. Rep. of Germany ....... 4213325

[51] Int. Cl.$^5$ .................. C22C 38/42; C01B 17/48; C01B 17/69; B01J 19/00
[52] U.S. Cl. .......................... 423/522; 423/532; 422/161; 422/240; 422/50; 75/302; 148/327
[58] Field of Search ................. 423/522, 531, 536; 422/160, 161, 240; 420/50; 75/302; 148/327

[56] References Cited

U.S. PATENT DOCUMENTS

| | | | |
|---|---|---|---|
| 3,663,215 | 5/1972 | Tanczyn | 420/50 |
| 3,674,468 | 7/1972 | Ota | 420/50 |
| 4,438,084 | 3/1984 | Rapp et al. | 423/387 |
| 4,543,244 | 9/1985 | Jones et al. | 423/522 |
| 4,873,055 | 10/1989 | Culling | 420/582 |
| 4,996,038 | 2/1991 | McAlister et al. | 423/531 |
| 5,032,373 | 7/1991 | Jones et al. | 423/531 |
| 5,051,233 | 9/1991 | Horn et al. | 420/50 |
| 5,118,490 | 6/1992 | McAuster | 423/533 |
| 5,120,496 | 1/1992 | Horn et al. | 420/50 |
| 5,151,248 | 9/1992 | Ebara et al. | 420/35 |

FOREIGN PATENT DOCUMENTS

| | | |
|---|---|---|
| 0013507 | 7/1980 | European Pat. Off. . |
| 0378998 | 7/1990 | European Pat. Off. . |
| 0516955 | 12/1992 | European Pat. Off. . |
| 2154126 | 5/1972 | Fed. Rep. of Germany . |
| 3320527 | 12/1983 | Fed. Rep. of Germany . |
| 688359 | 8/1993 | France . |
| 1534926 | 12/1978 | United Kingdom . |

OTHER PUBLICATIONS

Ullmanns Encyclopadie der technischen Chemie, 4th edition, vol. 21 (1982), pp. 157–159.
Ullmanns Encyclopadie der technischen Chemie, 4th edition, vol. 3 (1982), pp. 20–21.
Ullmanns Encyclopadie der technischen Chemie, 4th edition, vol. 22 (1982), p. 56.
I. Class and H. Grafen, Werkst. u. Korros, 1964, pp. 79–84.
H. Grafen, Werkst, u. Korros, 1965, pp. 876–879.
D. J. Chronister and T. C. Sjemce. Corrosion 85, paper 305, NACE, Boston/Mass., Mar. 1985.
R. J. Borges, Corrosion/87, Paper No. 23, NACE, Houston, Tex., 1987.
N. Sridhar, Materials Performance, Mar. 1988, pp. 40–46.

*Primary Examiner*—Gary P. Straub
*Attorney, Agent, or Firm*—Sprung Horn Kramer & Woods

[57] ABSTRACT

In a process such as the preparation of sulphuric acid wherein a wrought or cast material or a welding filler is contacted with hot concentrated sulphuric acid or oleum of up to 10 wt-%, the improvement which comprises forming the contact portion of said wrought or cast material or said filler of an austenitic iron-nickel-chromimum-silicon alloy comprising about 15.5 to 17.5 wt-% nickel
10 to 12 wt-% chromium
5.7 to 6.5 wt-% silicon
up to max. 0.06 wt-% carbon
up to max. 1.5 wt-% manganese
up to max. 0.03 wt-% phosphorus
up to max. 0.03 wt-% sulphur
up to max. 0.15 wt-% titanium
up to max. 0.8 wt-% zirconium
up to max. 0.2 wt-% nitrogen and
up to max. 0.3 wt-% molybdenum
and the remainder iron, together with minimal quantities of normally present impurities, including the deoxidizing elements magnesium, aluminum and calcium.

5 Claims, No Drawings

USE OF WROUGHT AND CAST MATERIALS AND WELDING FILLERS FOR MAKING AND USING HOT CONCENTRATED SULPHURIC ACID OR OLEUM

The present invention relates to the use of materials for components upon which hot concentrated sulphuric acid and 0 to 10 wt-% oleum impinge, and the preparation of sulphuric acid using such materials.

The literature contains numerous references to resistance of materials to corrosion by hot concentrated sulphuric acid.

Because solubility of lead sulphate increases with increasing sulphuric acid concentration, lead and lead alloys may be utilized only at concentrations of up to 78% $H_2SO_4$ and only up to 110° C. (Ullmanns Encyclopädie der technischen Chemie, 4th edition, vol. 21 (1982), p. 157).

Non-alloyed steel may be used in 68–99% strength sulphuric acids at up to 70° C., although corrosion rates of up to 1.3 mm/year must be expected (G. Nelson, Corrosion Data Survey, Shell Development Co., San Francisco, 1950, p. ZT-102A). Resistance of non-alloyed steel falls off markedly in the range 99 to 100% $H_2SO_4$ concentration. Elevated flow rates should be avoided with non-alloyed steel (Ullmann, loc. cit.; Z. f. Werkst.-Techn. 4 (1973), pp. 169/186; R. J. Borges, Corrosion/87, Paper No. 23, NACE, Houston, Tex., 1987).

Cast iron types alloyed with chromium or copper are resistant up to approximately 120° C. at sulphuric acid concentrations of from 90 to 99% (Ullmann, loc. cit.), but here too account must be taken of the dependence of corrosion on flow (Z. f. Werkst.-Techn., loc. cit.) The iron-silicon cast material with 14–18% Si is possessed of very good corrosion resistance over broad concentration and temperature ranges (Ullmann, loc. cit.); however, the hardness and brittleness of this special cast iron are a great disadvantage (R. J. Borges, Corrosion/87, loc. cit.; Ullmann, 4th edition, Vol 3 (1973), p. 21). Stainless austenitic standard steels, as in material No. 1.4571, are utilized with concentrated sulphuric acids at temperatures of up to 85° C. As the temperature increases, corrosion rates increase sharply. Even at 150° C., corrosion rates of around 1 mm/year must be expected (Z. f. Werkst.-Techn. 8 (1977), pp. 362/370 and 410/417), corrosion being conspicuously dependent on flow.

Use of nickel-based alloys is to no advantage. When plate heat exchangers of NiMo16Cr15W, material No. 2.4819 (Hastelloy alloy type C-276), are utilized for cooling concentrated sulphuric acid, the product temperature is limited to 95° C. (N. Sridhar, Materials Performance, March 1988, pp. 40/46).

There has thus been no shortage of proposals for improving resistance to sulphuric acid by alloying means. Thus, the 3.7–4.3% Si-containing austenitic stainless steel type ×1 CrNiSi 18 15, material No. 1.4361, shows a substantially greater resistance than material No. 1.4571 in, for example, 98.5% sulphuric acid at 150° and 200° C. (Ullmann, vol. 3, p. 21); the dependence of corrosion on flow is very low (Z. f. Werkst. Techn. 8 (1977), pp. 362/370 and 410/417; M. Renner and R. Kirchheiner, "Corrosion resistance of high-alloy stainless special steels in strongly oxidizing media", a paper delivered to the seminar on "Nickel materials and high-alloy special steels", held at Esslingen on 7th and 8th April 1986). Further increasing the Si content of austenitic stainless steels to 4.5 to 5.8%, and preferably 5.0 to 5.6%, brings about improved corrosion resistance in hot 85%, and preferably 90%, sulphuric acids, within certain limits (U.S. Pat. No. 4,543,244; DE-OS 33 20 527). Such a special steel is hardly contemplated for practical use at elevated temperatures because corrosion is so conspicuously dependent on temperature. The following corrosion rates were determined on a stainless, fully-austenitic steel of the composition 17.5% Cr, 17.5% Ni, 5.3% Si, remainder substantially iron, in 98.2% sulphuric acid (cited U.S. '244 and DE '527):

| | |
|---|---|
| 125° C. | 0.1 mm/year, |
| 135° C. | 0.8 mm/year, |
| 145° C. | 1.6 mm/year, | in 93.5% $H_2SO_4$ a corrosion rate of 0.25 mm/year was observed at 85° C. Anodic protection may be provided to reduce plant corrosion; under these conditions the corrosion rate in 93.5% $H_2SO_4$ is, however, still 1.1 mm/year at 200° C. Furthermore, the appreciable dependence of corrosion of stainless chromium-nickel-silicon steel on flow in sulphuric acids must also be considered a disadvantage; for example, the corrosion rate of a rotating disc (30 mm diameter, 2,000 rpm) in 96% sulphuric acid at 150° C. is as high as 3.7 mm/year.

Furthermore, heat-treatable nickel-based alloys having 2–4% Si content have been proposed for handling hot sulphuric acid at a concentration of at least 65% (DE-PS 21 54 126). However, corrosion rates in sulphuric acid heated to 120° C. are, at approximately 0.6 mm/year, very high. Corrosion rates of 0.25 mm/year in 98% $H_2SO_4$ heated to 140° C. are given for a further age-hardenable and nickel-based alloy which is not flow-sensitive (R. J. Borges, Corrosion/87, loc. cit.).

An austenitic stainless steel having 17% Cr, 16% Ni, 3.7% Si and 2.3% Mo content can, on the other hand, be used only in cold sulphuric acids at concentrations below 10% and above 80% (publication No. 235 of CAFL: Uranus, rust- and acid-resistant steels for difficult corrosion problems, p. 37).

GB 1 534 926 furthermore describes austenitic stainless chromium-nickel-silicon-copper-molybdenum steels which have high corrosion resistance in concentrated sulphuric acid; these steels are characterized by the following composition (percentages by weight):

| | |
|---|---|
| C | max. 0.06% |
| Si | 4.1 to 12% ($\geq$ 4.7%; 6.5 to 12%; 7 to 11%; 7.5 to 10%) |
| Mn | max. 4% (3%; 1%, 0.5%) |
| Cr | 6 to 22% (6 to 17%; 8 to 15%; 9 to 14%) |
| Ni | 10 to 40% (10 to 25%; 12 to 23%; 14 to 20%) |
| (Mo + ½W) | max 1.5% (0.5 to 1%) |
| Cu | 0.6 to 4% ($\geq$ 1%; 1.5 to 3.5%; 2 to 3%) |
| N | max. 0.2% and |
| Nb + Ta + Zr + V | max. 2% |

Such steels have the deficiency that the alloying element molybdenum markedly increases the tendency of austenitic stainless chromium-nickel-silicon steels towards embrittlement, which can lead to considerable difficulties, inter alia during hot working, for example when pressing bases. Moreover, the alloying element copper also gives rise to difficulties as regards hot workability (Ullmanns Encyclopädie der technischen Chemie, 4th edition (1982), vol. 22, p. 56) and susceptibility to hot fissuring. Furthermore, account must be taken of the susceptibility of copper-alloyed stainless austenitic steels to stress corrosion cracking in hot sulphuric acids (I. Class and H. Gräfen, Werkst. u. Korros. 1964, pp. 79/84; H. Gräfen, Werkst. u. Korros. 1965, pp. 876/879).

Finally, 4-6% silicon-containing iron-chromium-nickel alloys having a deltaferrite proportion which is limited to 5 to 10% so as to preclude the possibility of coherent deltaferrite network formation (D. J. Chronister and T. C. Spence, Corrosion 85, paper 305, NACE, Boston/Mass., March 1985), have also been described. This type of network is to be expected with deltaferrite percentages greater than 10%. D. J. Chronister et al. describe the case of a 4.8% silicon-containing alloy in which corrosion rates in 95% $H_2SO_4$ heated to 110° C. are at first relatively small (0.4 mm/year), but increase rapidly to 2.4 mm/year as stressing becomes more prolonged. Alloys containing 5 to 5.2% Si were found to suffer corrosion rates of 0.11 to 0.56 mm/year under these conditions. Not until 5.6% Si do corrosion rates of approximately 0.1 m/year set in. If the temperature of the 95% $H_2SO_4$ is increased to 130° C., increasing corrosion rates are once more observed at an Si content of 5.6%, with 0.66 mm/year in the first part of the test (48 h) and as much as 1.24 mm/year in the second part; when the Si percentage is 5.9%, the corrosion rates are 0.45-0.54 mm/year.

The object was therefore to make available, for use for components which are exposed to hot concentrated sulphuric acid or oleum, materials from which components can be manufactured which exhibit low corrosion rates under the aforementioned extreme conditions; the material should additionally exhibit good mechanical and technological properties, so that it can be utilized in the preparation of sulphuric acid.

This object was, surprisingly, able to be achieved with wholly special materials.

The present invention provides the use of wrought and cast materials and welding fillers of austenitic iron-nickel-chromium-silicon alloys having

| 15.5 to 17.5 wt % | nickel |
| 10 to 12 wt % | chromium |
| 5.7 to 6.5 wt % | silicon |
| up to max. 0.06 wt % | carbon |
| up to max. 1.5 wt % | manganese |
| up to max. 0.03 wt % | phosphorus |
| up to max. 0.03 wt % | sulphur |
| up to max. 0.15 wt % | titanium |
| up to max. 0.8 wt % | zirconium |
| up to max. 0.2 wt % | nitrogen |
| up to max. 0.3 wt % | molybdenum | and the remainder iron together with minimal quantities of normally present impurities, including the deoxidizing elements magnesium, aluminum and calcium, for components on which hot concentrated sulphuric acid or 0 to 10 wt-% oleum impinge.

The material may preferably contain up to 0.01 wt-% boron and up to 0.25 wt-% rare earth metals in order to improve hot workability.

The materials preferably contain up to a maximum of 0.03 wt-%, and especially preferably up to a maximum of 0.02 wt-%, of carbon.

The materials used are possessed of favorable mechanical and technological properties. Despite the high proportion of silicon the impact value of the materials is satisfactory. The alloys can be manufactured in all the industrially important forms, such as sheet, strip, tube, rod and wire. Further forms include steel castings for e.g. pumps and valves. The nickel-chromium-silicon-iron alloys lend themselves well to welding, so that it is possible to utilize welded construction in the manufacture of equipment. The welding filler may be of the same type or may on the other hand exhibit a deltaferrite content of up to approximately 20%.

The materials used are to a high degree corrosion-resistant to $H_2SO_4$ at over 75 wt-% strength, preferably to 85 to 100 wt-%, and especially preferably to 90 to 100 wt-% $H_2SO_4$ and to 0 to 10 wt-% oleum. This high corrosion resistance obtains even at high temperatures, for example at 90° to 370° C., preferably 150° to 340° C., and especially preferably at 200° C. up to the boiling point of the variously highly-concentrated sulphuric acids or oleum. The materials and/or components may be impinged upon at pressures of from 0.1 bar to 10 bar by hot concentrated sulphuric acid or 0 to 10 wt-% oleum. The materials may be used for components which are impinged upon by such hot concentrated sulphuric acids. Such components are for example reaction vessels, pumps, valves, piping, heat exchangers, inter alia. Such components may be manufactured by forging and rolling (wrought), casting, lining, plating, shaping, welding or resurfacing by welding.

A maximum corrosion rate of 1 mm/year, but normally a maximum of 0.1 to 0.2 mm/year, is understood to constitute a high corrosion resistance under the cited aggravated conditions.

The properties of the materials used are all the more surprising since D. R. McAlister et al., Chemical Engineering Progress, July 1986, pp. 34/38, show that higher silicon contents in austenitic chromium-nickel-(molybdenum) steels are insignificant in terms of corrosion behavior when impinged upon by hot concentrated sulphuric acid.

The invention also provides a process for the preparation of sulphuric acid by catalytic oxidation of sulphur dioxide to sulphur trioxide, absorption of the sulphur trioxide in sulphuric acid having a concentration of between 98 and 10%, wherein heat of absorption is generated, and the absorption is performed in a tower into which the sulphuric acid is introduced at a temperature of over 120° C., the sulphuric acid leaves the heat exchanger at a concentration in excess of 99% and a temperature in excess of 120° C., and the heat of absorption is removed in a heat exchanger by conduction to other fluids or by steam generation, which process is characterized in that the heat exchanger and optionally other components which are in contact with the hot sulphuric acid are of austenitic iron-nickel-chromium-silicon alloys having

| 15.5 to 17.5 wt % | nickel |
| 10 to 12 wt % | chromium |
| 5.7 to 6.5 wt % | silicon |
| up to max. 0.06 wt % | carbon |
| up to max. 1.5 wt % | manganese |
| up to max 0.03 wt % | phosphorus |
| up to max. 0.03 wt % | sulphur |
| up to max. 0.15 wt % | titanium |
| up to max. 0.8 wt % | zirconium |
| up to max. 0.2 wt % | nitrogen |
| up to max. 0.3 wt % | molybdenum |
| and the remainder iron | | together with minimal quantities of normally present impurities, including the deoxidizing elements magnesium, aluminum and calcium.

Utilization of the special alloys enables high-grade steam (steam pressure >5 bar) to be generated during sulphuric acid preparation and hence utilization of the heat of absorption to be optimized. Moreover, it is possible to operate with high sulphuric acid temperatures.

The invention is explained in greater detail by reference to the following examples.

EXAMPLE

Material samples of a hot-rolled 3 mm thick sheet of the following composition were investigated (percentages by weight):

| | |
|---|---|
| 0.015% | carbon |
| 5.94% | silicon |
| 0.68% | manganese |
| 0.021% | phosphorus |
| 0.001% | sulphur |
| 11.34% | chromium |
| 17.49% | nickel |
| 0.09% | molybdenum |
| 0.41% | zirconium and |
| 0.10% | titanium |
| and the remainder iron. | |

The corrosion rate of this austenitic steel is <0.1 mm/year in 96% boiling sulphuric acid (320° C.); corrosion rates of <0.1 mm/year were also measured in 92% $H_2SO_4$ at 190° C.

The corrosion rate of 0.1 mm/year (rotating disc of diameter 30 mm at 2,000 rpm) is evidence that in the case of this austenitic nickel-chromium-silicon steel in 96% sulphuric acid at 150° C. dependence of corrosion on flow is low.

It will be understood that the specification and examples are illustrative hut not limitative of the present invention and that other embodiments within the spirit and scope of the invention will suggest themselves to those skilled in the art.

We claim:

1. In a process for the preparation of sulphuric acid by catalytic oxidation of sulphur dioxide to sulphur trioxide, absorption of the sulphur trioxide in sulphuric acid having a concentration of between 98 and 101%, wherein heat of absorption is generated and the absorption is performed in a tower into which the sulphuric acid is introduced at a temperature in excess of 120° C., the sulphuric acid leaving the tower exhibits a concentration greater than 99% and a temperature greater than 120° C., and the heat of absorption is removed in a heat exchanger by conduction to other fluids, the improvement which comprises forming the heat exchanger or other components which contact the hot sulphuric acid of an austenitic iron-nickel-chromium-silicon alloy comprising about

| | | |
|---|---|---|
| 15.5 to 17.5 | wt % | nickel |
| 10 to 12 | wt % | chromium |
| 5.7 to 6.5 | wt % | silicon |
| 0 to 0.06 | wt % | carbon |
| 0 to 1.5 | wt % | manganese |
| 0 to 0.03 | wt % | phosphorus |
| 0 to 0.03 | wt % | sulphur |
| 0 to 0.15 | wt % | titanium |
| 0 to 0.8 | wt % | zirconium |
| 0 to 0.2 | wt % | nitrogen |
| 0 to 0.3 | wt % | molybdenum | and the remainder iron, and wherein the sulphuric acid leaves the tower at a temperature of from about 200° to 280° C.

2. A process according to claim 1, wherein the heat of absorption is removed into heat exchangers in order to generate steam having a pressure of from about 1.5 to 31 bar (absolute).

3. Wrought or cast materials or welding fillers resistant to sulphuric acid at a strength of over 75 wt-% and oleum at a strength of 0 to 10 wt-% at a temperature of from 90° to 370° C. and pressures of from about 0.1 bar to 10 bar comprising an austentitic iron-chromium-nickel-silicon alloy containing about

| | |
|---|---|
| 15.5 to 17.5 wt % | nickel |
| 10 to 12 wt % | chromium |
| 5.7 to 6.5 wt % | silicon |
| 0 to 0.06 wt % | carbon |
| 0 to 1.5 wt % | manganese |
| 0 to 0.03 wt % | phosphorus |
| 0 to 0.03 wt % | sulphur |
| 0 to 0.15 wt % | titanium |
| 0 to 0.8 wt % | zirconium |
| 0 to 0.2 wt % | nitrogen |
| 0 to 0.3 wt % | molybdenum | and the remainder iron.

4. The wrought or cast material or welding filler, according to claim 3, wherein the alloy additionally contains boron in an amount of up to about 0.1 wt-% and rare-earth metals in an amount of up to about 0.25 wt-%.

5. The wrought or cast material or welding filler, according to claim 3, wherein the alloy contains about 0–0.03 wt-% carbon.

* * * * *